No. 721,321. PATENTED FEB. 24, 1903.
C. C. NESMITH & J. L. BREWER.
ANIMAL TRAP.
APPLICATION FILED NOV. 26, 1902.
NO MODEL.
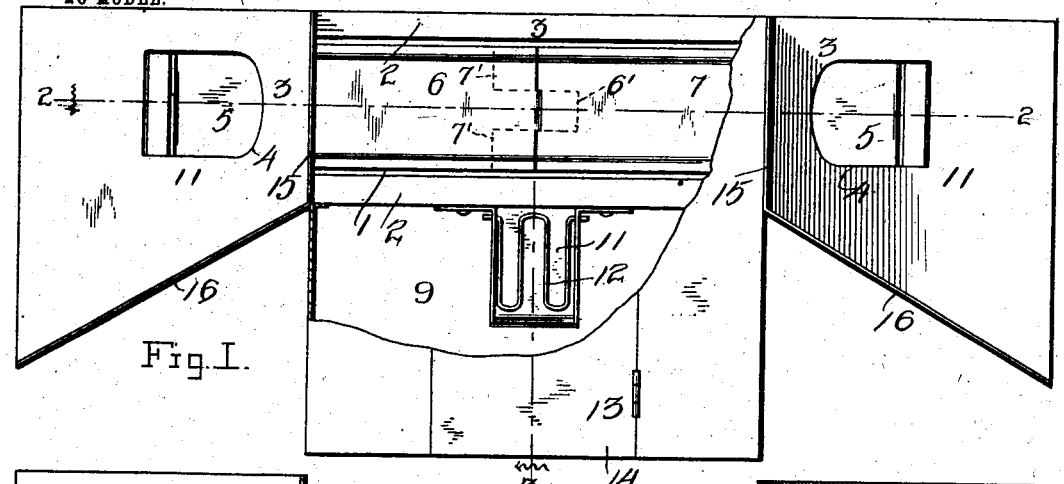
Fig. 1.
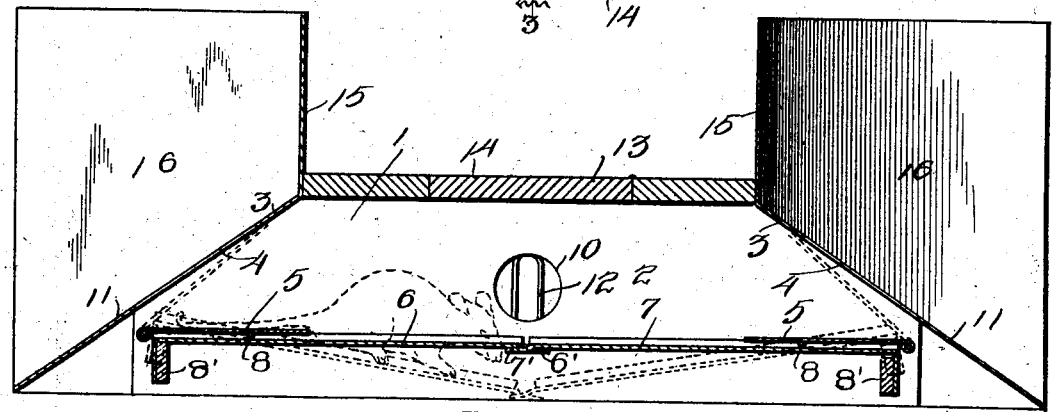
Fig. 2.
Fig. 3.
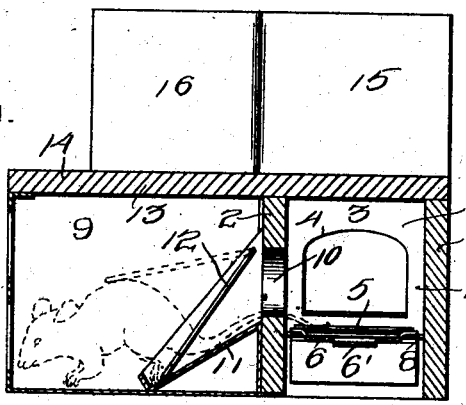
Fig. 4.
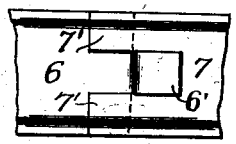
Fig. 5.
Witnesses
E. H. Reichenbach.
L. Hilton
Inventors
Christopher C. Nesmith and
Joel L. Brewer.
By H. B. Willson & Co.
Attorneys

UNITED STATES PATENT OFFICE.

CHRISTOPHER C. NESMITH AND JOEL L. BREWER, OF MANCHESTER, ALABAMA.

ANIMAL-TRAP.

SPECIFICATION forming part of Letters Patent No. 721,321, dated February 24, 1903.

Application filed November 26, 1902. Serial No. 132,954. (No model.)

*To all whom it may concern:*

Be it known that we, CHRISTOPHER C. NESMITH and JOEL L. BREWER, citizens of the United States, residing at Manchester, in the county of Marshall and State of Alabama, have invented certain new and useful Improvements in Animal-Traps; and we do declare the following to be a full, clear, and exact description of the invention, such as will enable others skilled in the art to which it appertains to make and use the same.

This invention relates to improvements in animal-traps, and particularly to the class of self-setting traps.

The object is to construct a trap of this character which will be positive and reliable in action, simple in construction, and ever ready for an animal to enter.

A further object is to provide a trap which from its construction will attract animals into itself without the necessity of bait.

With these and other objects in view the invention consists in the construction and arrangement of the parts, as will be hereinafter more fully described and claimed, reference being had to the accompanying drawings, in which—

Figure 1 is a top plan view of the trap, parts being broken away to more clearly illustrate the interior construction. Fig. 2 is a vertical longitudinal section on the line 2 2 of Fig. 1. Fig. 3 is a vertical transverse section on the line 3 3 of Fig. 1. Fig. 4 is an enlarged fragmentary sectional view of the interlocking ends of the vestibule bottom plates. Fig. 5 is a fragmentary bottom plan view of the same.

In the drawings, 1 denotes the runway-passage or vestibule of the trap, formed by two vertically-disposed parallel side walls 2, the end walls 3 of which slope downwardly and are provided with entrance-openings 4, which are adapted to be closed by inwardly-opening doors 5, hinged at their lower edges between the side walls 2. The bottom of said passage is formed of two plates 6 and 7, pivotally supported near their outer ends upon cross pins or bars 8, arranged between the walls 2, the inner ends of the plates 6 and 7 being provided with interlocking fingers or projections 6' and 7'. As shown in the drawings, the plate 6 is provided with one centrally-arranged finger or projection 6', while the plate 7 has two fingers 7' arranged at the sides of the plate and between which the finger 6' on plate 6 is adapted to pass. The projections or fingers are bent slightly downward and are adapted to pass beneath the opposing ends of the plates, the projection 6' passing beneath the plate 7 and the projections 7' passing beneath the plate 6.

The outer ends of the plates 6 and 7 are bent downwardly at right angles and have fixed thereto counterbalancing-weights 8', which are adapted to normally hold the plates in a horizontal position with their fingered inner ends interlocking. This interlocking feature of the bottom plates serves a double function—first, in locking the inner ends of the plates against upward movement above a horizontal level, and, secondly, in preventing the animal's feet from being caught between the ends of the plates when the said ends are tilted downwardly by reason of the weight of the animal thereon.

When the bottom plates of the passage-way are in their normal or horizontal position, the doors 5 are adapted to lie back flat upon the same, as shown in full lines in Fig. 2 of the drawings; but when an animal enters the passage-way and depresses the inner ends of the bottom plates the outer ends of the same will be elevated and raise the doors 5 against the inner side of the inclined end walls of the passage and close the openings therein.

9 denotes the cage or body of the trap, which adjoins the passage-way at one side thereof and has communication therewith through an opening 10, formed in the contiguous side of the passage.

11 denotes a downwardly-inclined guideway projecting from the opening 10 into the cage 9. This guideway is formed with beveled or tapering sides, between which and at the upper and wider ends thereof is pivoted the upper end of a drop-door 12, the lower end of which rests on the bottom of said inclined guideway. The lower end of the bottom of this guideway is provided with an upwardly-turned end or flange which prevents the animals imprisoned in the cage from raising the door 12 by inserting their feet or noses beneath the lower end of the same.

13 denotes a top or cover common to both the cage and the passage-way 1, and 14 denotes a door by which access may be had to both the cage and the passage-way.

The cage is provided on one or more of its sides with gratings or openings to admit light which will attract the animals from the passage-way into the cage in hope of escape through said openings.

At the top of the inclined end walls of the passage-way are formed upwardly-projecting walls 15, which extend for some distance above the top of the trap and form stops or obstructions. These walls also extend along one side of the projecting inclined ends of the passage-way and flare or are deflected outwardly from the same to form wings 16, which tend to direct the course of the animal into the doors or openings in the ends of the passage-way. These walls extend high enough above the body of the trap to deter the animal from passing over the same.

The inclined guideway 11, which projects into the cage from the opening in the passage-way, has its lower free end in close proximity to the floor of the cage, so that the animal may walk right off the guideway onto the cage-floor and will not be deterred by a space necessitating a jump to the cage-floor, as might be the case should the guideway project horizontally from the cage-wall.

When setting the trap, the passage-way side of the same is placed against a wall or other obstruction. The flaring wings 16 and wall 15 will direct an animal which might run along near the wall toward the trap, and seeing an open hole will readily run into the same, and thus be captured without the use of bait. If desired, however, bait may be used, it being laid upon the plates forming the passage-way floor.

While we have described the use of the stop-walls and wings in connection with the trap, it is obvious that the same may be constructed and used without the use of the same.

From the foregoing description, taken in connection with the accompanying drawings, it is thought that the construction, operation, and advantages of our improved animal-trap will be readily apparent without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

In an animal-trap of the class described, the combination with a cage of a vestibule or passage-way, having inclined end walls, openings formed in said end walls, pivoted drop-doors adapted to close said openings, pivoted floor-plates arranged in said passage-way, the inner ends of which are formed with interlocking fingers, counterbalancing-weights fixed to the outer ends of said floor-plates, said outer ends being adapted to close said pivoted drop-doors by weight of an animal upon the inner end of the same, stop-walls and flaring wings arranged adjacent to the openings in said passage-way, whereby the course of an animal is directed to said openings, a door or opening communicating between said passage-way and said cage, a downwardly-inclined guideway extending from said door to the floor of said cage, and a drop-door for closing said door and guideway, substantially as described.

In testimony whereof we have hereunto set our hands in presence of two subscribing witnesses.

CHRISTOPHER C. NESMITH.
JOEL L. BREWER.

Witnesses:
SILAS P. BEARD,
ANDREW A. SULSER.